J. F. SCYPINSKI.
BOTTLE.
APPLICATION FILED FEB. 7, 1916.

1,223,207. Patented Apr. 17, 1917.

Witnesses

Inventor
John F. Scypinski.
By Victor J. Evans
Attorney

UNITED STATES PATENT OFFICE.

JOHN F. SCYPINSKI, OF DETROIT, MICHIGAN.

BOTTLE.

1,223,207.  Specification of Letters Patent.  Patented Apr. 17, 1917.

Application filed February 7, 1916. Serial No. 76,756.

*To all whom it may concern:*

Be it known that I, JOHN F. SCYPINSKI, a citizen of the United States, residing at Detroit, in the county of Wayne and State of Michigan, have invented new and useful Improvements in Bottles, of which the following is a specification.

The invention relates to a bottle, and more particularly to the class of sanitary medicine or liquid dispensing bottles or the like.

The primary object of the invention is the provision of a bottle of this character wherein the necessity of the use of a spoon or other separate measuring article is obviated, as the bottle itself may be used to measure the desired quantity of medicine or liquid which can be administered with exactness or accuracy directly from the bottle without possibility of spilling, either when measuring a given quantity or administering a dose to a person.

Another object of the invention is the provision of a bottle of this character wherein the construction of the neck thereof is novel in form to permit a predetermined quantity of medicine or liquid to be measured for the dispensing thereof directly from the bottle, thereby obviating the possibility of administering an overdose or inaccurate measurement of the dose.

A further object of the invention is the provision of a bottle of this character which is comparatively simple in construction and reliable for the purpose stated.

Other objects will be in part obvious and in part hereinafter pointed out.

The invention accordingly consists in the features of construction, combination of elements and arrangement of parts which will be exemplified in the construction hereinafter set forth, and the scope of the application of which will be indicated in the claim hereunto appended.

In the drawings.

Similar reference characters indicate corresponding parts throughout the several views of the drawing.

Figure 1:
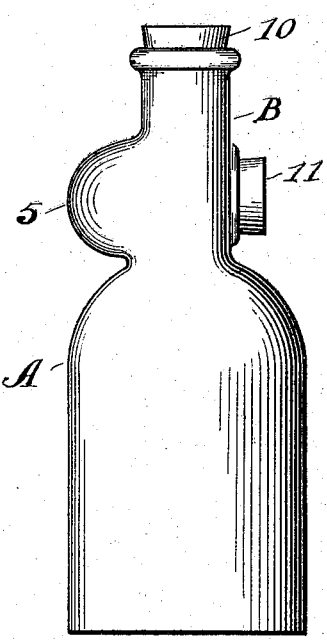
Figure 1 is a side elevation of a bottle constructed in accordance with the invention.
Figure 2:
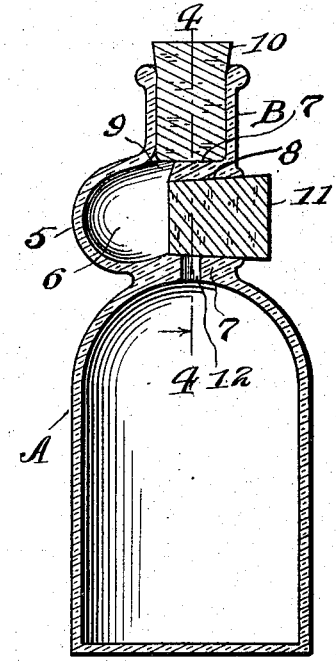
Fig. 2 is a vertical sectional elevation thereof.
Figure 3:
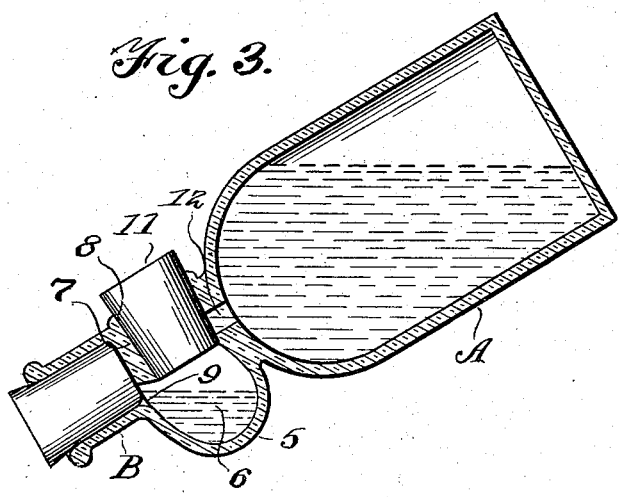
Fig. 3 is a view similar to Fig. 2, showing the bottle tilted for measuring a quantity of liquid therein.
Figure 4:
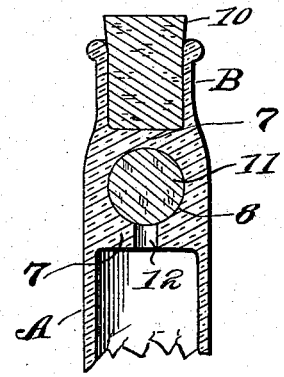
Fig. 4 is a fragmentary vertical transverse sectional view through the bottle.

Referring to the drawing in detail, A designates the body of the bottle, which may be of any desirable size, having a capacity to hold a predetermined quantity of liquid or medicine. The body is formed with a neck B, as usual, while one side of said neck is enlarged to form a protuberance 5 thereon, said protuberance providing a chamber 6 interiorly of the neck for measuring purposes, hereinafter fully described.

The neck B adjacent its intersection with the body A has formed therein opposite said protuberance a transversely disposed cylindrical shell or wall 7 providing a transverse passage or conduit 8 which opens into the chamber 6 and also opens through one side of the neck B of the bottle. The cylindrical shell or wall 7 providing the passage or conduit is formed with a port 9 to establish communication between the bore in the neck B and said chamber 6 for permitting a quantity of liquid admitted to the chamber 6 to flow through the neck therefrom for dispensing the said liquid, the bore of the neck B being fitted with a removable cork or stopper 10 for closing the same and the port 9 in the shield or wall 7, while the outer open end of the passage or conduit 8 has fitted therein a removable stopper or cork 11 in the shield or wall 7 opposite the port 9. The port 12 which is offset with relation to the port 9 establishes communication between the passage or conduit and the body A so that by partially withdrawing the cork or stopper 11 from the passage 8 the port 12 will be opened to the extent desired to control the flow of liquid from the body A through the passage or conduit 8 into the chamber 6 for the measuring of a predetermined quantity of liquid prior to the dispensing thereof through the neck B on the removal of the other stopper or cork 10 therefrom, it being understood that when the measured liquid in the chamber 6 is to be dispensed the cork or stopper 11 is moved within the passage or conduit 8 to close the port 12 and thus shutting off the flow of the liquid from the body A of the bottle.

It will be impossible for the liquid to flow from the body A of the bottle through the neck B when the stopper 11 is in position within the passage or conduit 8 to close the port 12. When the stopper 11 is partially withdrawn from the conduit or passage 8 to open the port 12 the liquid from the body A will flow into the chamber 6 which serves to measure the quantity of liquid so that by again moving the stopper 11 in the passage or conduit 8 to close the port 12 and the removal of the stopper 10 from the neck B of the bottle the liquid within the chamber 6 can be dispensed from the bottle in a predetermined quantity, thereby enabling the administering of a fixed or exact quantity of the liquid or medicine directly from the bottle and thus avoiding an over- or underdose of the same, and at the same time dispensing with the use of a spoon or other measuring article for this purpose.

From the foregoing description, taken in connection with the accompanying drawings, the construction and manner of use of the invention will be readily understood and a more extended explanation has, therefore, been omitted.

Having thus described my invention, I claim:

A bottle having a neck having an enlargement upon one side thereof providing a chamber within said neck at its intersection with the bottle body, a cylindrical wall extending inwardly from the opposite side of the neck and providing a transversely extending passage therein having an outer end opening out exteriorly of the neck and an inner end opening into said chamber, said wall having ports at opposite points therein offset with relation to each other and establishing communication respectively between the bottle body and chamber, and the chamber and neck.

In testimony whereof I affix my signature in presence of two witnesses.

JOHN F. SCYPINSKI.

Witnesses:
JOHN KAMINSKI,
PAUL A. KLEBBA.

Copies of this patent may be obtained for five cents each, by addressing the "Commissioner of Patents, Washington, D. C."